United States Patent
Wang et al.

(10) Patent No.: US 6,265,507 B1
(45) Date of Patent: Jul. 24, 2001

(54) COPOLYMERIZATION OF FLUORINATED OLEFINS

(75) Inventors: Lin Wang, Hockessin; Edward Bryan Coughlin; Zhen-Yu Yang, both of Wilmington, all of DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/132,293

(22) Filed: Aug. 11, 1998

Related U.S. Application Data

(60) Provisional application No. 60/055,283, filed on Aug. 13, 1997.

(51) Int. Cl.[7] .................................................. C08F 14/18
(52) U.S. Cl. ........................ 526/253; 526/206; 526/243; 526/247
(58) Field of Search .................................... 526/253, 247, 526/206, 243

(56) References Cited

U.S. PATENT DOCUMENTS

| | | | |
|---|---|---|---|
| 4,123,602 | 10/1978 | Ukihashi et al. | 526/206 |
| 4,166,165 | 8/1979 | Hisasue et al. | 526/87 |
| 4,617,363 * | 10/1986 | Su | 526/253 |
| 4,736,006 * | 4/1988 | Reimschuessel et al. | 526/247 |
| 4,914,158 * | 4/1990 | Yoshimura et al. | 525/199 |
| 5,494,984 * | 2/1996 | Funaki et al. | 526/206 |
| 5,550,661 * | 8/1996 | Clark et al. | 359/73 |

FOREIGN PATENT DOCUMENTS

| | | | |
|---|---|---|---|
| 28 22 116 | 11/1978 | (DE) | C08F/214/26 |
| 0 193 202 | 9/1986 | (EP) | C08F/14/18 |
| WO 96/23010 | 8/1996 | (WO) | C08F/210/16 |
| WO 97 27238 | 7/1997 | (WO) | C08G/65/20 |

OTHER PUBLICATIONS

Boor, J "Ziegler–Natta catalysts and polymerizations", Academic Press, Inc, N–Y, 4–th edition, pp. 302, 1979.*
Olabashi O. "Handbook of Thermoplastics", marcel Dekker, Inc., N–Y, pp. 39, 1997.*

* cited by examiner

*Primary Examiner*—David W. Wu
*Assistant Examiner*—Tanya Zalukaeva

(57) ABSTRACT

Selected partially fluorinated olefins containing terminal unfluorinated vinyl groups, and optionally containing other functional groups, may be copolymerized with other olefins such as ethylene and/or propylene using metallocene or Ziegler-Natta type polymerization catalyst systems. The resulting polymers may be used as molding resins, elastomers, for films and in coatings.

10 Claims, No Drawings

COPOLYMERIZATION OF FLUORINATED OLEFINS

This application claims the benefit of U.S. Provisional Application No. 60/055,283, filed Aug. 13, 1997.

FIELD OF THE INVENTION

Selected partially fluorinated olefins, optionally containing other functional groups, may be copolymerized with other olefins using metallocene or Ziegler-Natta type polymerization catalyst systems.

TECHNICAL BACKGROUND

Olefins, especially hydrocarbon olefins, may be polymerized by a variety of catalyst systems, including those systems containing transition metals, such as the metallocene and Ziegler-Natta type catalyst systems. These polymerization systems, and others, are used to produce millions of tons of polyolefins each year. For the most part however, these polymerization systems are limited to olefins which do not contain functional groups, especially functional groups which are considered to be potentially reactive and/or have the ability to coordinate to (part of) the transition metal containing catalyst system.

The ability to copolymerize substituted olefins is valuable, since the resulting polymers may have different and more valuable properties. These polymers may have improved resistance to chemicals, may themselves be chemically reactive or be able to serve as catalysts, have altered surface properties, etc. Thus methods for the copolymerization of olefins containing elements in addition to carbon and hydrogen are desired.

SUMMARY OF THE INVENTION

This invention concerns a process for copolymerizing a first olefin with at least one second olefin, said second olefin containing only carbon and hydrogen, using as a polymerization catalyst system either a Ziegler-Natta-type catalyst or a metallocene-type catalyst, wherein the improvement comprises, said first olefin has the formula $H_2C=CH(CH_2)_a R_f R^1$, and wherein:

a is an integer of 2 to 20;

$R_f$ is perfluoroalkylene optionally containing one or more ether groups; and $R^1$ is halogen, hydrogen or a functional group.

DETAILS OF THE INVENTION

The catalyst systems useful herein are so-called Ziegler-Natta or metallocene type catalyst systems, which are well known to the artisan, see for instance Angew. Chem., Int. Ed. Engl., vol. 34, p. 1143–1170 (1995), European Patent Application 416,815 and U.S. Pat. No. 5,198,401 for information about metallocene-type catalysts, and J. Boor Jr., Ziegler-Natta Catalysts and Polymerizations, Academic Press, New York, 1979 and G. Allen, et al., Ed., Comprehensive Polymer Science, Vol. 4, Pergamon Press, Oxford, 1989, p. 1–108, 409–412 and 533–584, for information about Ziegler-Natta-type catalysts, and all of these are hereby included by reference. All of the catalyst systems used should be able (and most systems of this type are able) to polymerize α-olefins. By an α-olefin is meant a compound of the formula $H_2C=CH(CH_2)_b H$ wherein b is an integer, preferably an integer of 1 to 18.

"Normal" polymerization conditions may be used when copolymerizing the first olefin with other olefins. By this is meant the usual conditions for polymerizing α-olefins with the metallocene or Ziegler-Natta-type catalysts chosen may also be used when the first olefin is present in the polymerization. No "special" conditions are needed, although as the artisan will understand any individual polymerization process will have its optimum conditions, readily determined by techniques known in the art. A metallocene-type catalyst is preferred.

Useful second olefins include one or more of ethylene, propylene and other α-olefins, 1,3-butadiene, styrene, α-methylstyrene, norbornene and cyclopentene. Preferred second olefins are one or both of ethylene and propylene, and ethylene is an especially preferred second olefin.

By perfluoroalkylene is meant a divalent saturated group containing only carbon and fluorine. Herein, $R_f$ may also contain one or more ether groups between carbon atoms in the perfluoroalkylene group.

In preferred first olefins $R_f$ contains 2 to 20 carbon atoms, and more preferably is $-(CF_2)_g-$, wherein g is 2 to 20, or $-(CF_2)_h OCF_2 CF_2-$ wherein h is 2 to 20. By a functional group for $R^1$ is meant a group which may readily undergo a chemical reaction. For instance a sulfonyl fluoride group may be readily hydrolyzed, esterified, or converted to a sulfonamide. Useful groups for $R^1$ include hydrogen, chlorine, bromine or iodine, and functional groups such as $-P(O)(OR^3)_2$ wherein each $R^3$ is independently hydrocarbyl, sulfonic acid ($-SO_3H$), and sulfonyl halide. By hydrocarbyl herein is meant a univalent group containing only carbon and hydrogen, and preferably containing 1 to 20 carbon atoms. Preferred groups for $R^1$ include fluorine, sulfonic acid, and sulfonyl fluoride, and fluorine and sulfonyl fluoride are especially preferred. A sulfonic acid group containing polymer does not have to be polymerized directly. It is preferably made by hydrolysis of a sulfonyl halide group present in an already made polymer. Also when polymerizing a first monomer which contains a highly acidic group such as sulfonic acid, some additional amount of a compound such as an alkylaluminum compound, which is commonly used in metallocene or Ziegler-Natta-type polymerizations may be needed since the sulfonic acid may react with the alkylaluminum compound, forming an aluminum salt of the sulfonic acid.

Representative methods of making the first monomers may be found in World Patent Application 96/23010.

It is preferred that the product of the polymerization process described (the polymer produced) herein contains about 0.1 to 50 mole percent, more preferably about 1 to about 15 mole percent, of repeat unit derived from the first olefin. The proportion of repeat units derived from the first olefin in the product polymer will depend on a number of factors, such as the other olefin(s) used, the polymerization catalysts system, etc., but the proportion of first olefin derived repeat units in the resulting polymer can usually be varied by changing the proportion of first olefin to second olefin(s) in the polymerization process.

The polymer produced in the process may be a dipolymer, i.e., a copolymer of a first olefin and a single second olefin, a terpolymer, which may be a copolymer of one or two first olefins with a single second olefin or a copolymer of a single first olefin with two second olefins, or a copolymer containing more different repeat units chosen from first and/or second olefins.

If the polymerization catalyst system used is capable of producing stereospecific polymers under the polymerization process conditions used, a stereospecific polymer may be produced. See for instance Example 5.

The polymers made in the polymerization process described herein may be used as molding resins, catalysts, elastomers (when the Tm and Tg of the polymer are about or below ambient temperature), as compatibilizers for polymer blends, for films, and in coatings. These uses may take advantage of altered (compared to simple polyolefins) properties such as the presence of catalytically active groups (see World Patent Application 96/230210) and/or improved hydrophobic surface properties.

In the Examples the following abbreviations are used:

DSC—Differential Scanning Calorimetry
GPC—Gel Permeation Chromatography
ODCB—o-dichlorobenzene
PE—polyethylene
PMAO—poly(methylaluminoxane)
PS—polystyrene
RT—room temperature
TCB—1,2,4-trichlorobenzene
TCE—1,1,2,2-tetrachloroethane
Tg—glass transition temperature
THF—tetrahydrofuran
Tm—melting point Tm's and Tg's were measured at a DCS heating rate of 10° C./min. The Tg was taken as the midpoint of the transition, while the Tm was taken as the peak of the melting endotherm.

EXAMPLE 1

Synthesis of an Ethylene Copolymer of $CH_2=CH(CH_2)_4(CF_2)_2O(CF_2)_2SO_2F$

The catalyst rac-ethylenebis(indenyl)zirconium (IV) dichloride [see W. Kaminsky, et al., Angew. Chem., Int. Ed. Engl., vol. 24, p. 507(1985) and Q. Yang, et al., Syn. Lett., 1996, p. 147] (3.2 mg, 0.0077 mmol) and $CH_2=CH(CH_2)_4(CF_2)_2O(CF_2)_2SO_2F$ (5.0 g, 0.013 mol) were mixed with 35 mL toluene in a Schlenk flask in a drybox. The flask was placed under 101 kPa (absolute) of ethylene and was purged with ethylene for 15 min. PMAO (10 mL 7.1 wt % toluene solution) was added to the mixture. Reaction was immediately initiated and it was exothermic. After stirring under 101 kPa of ethylene at RT for 30 min, methanol (350 mL) was slowly added to the reaction mixture followed by 5 mL conc. HCl. The white solid polymer was filtered, washed with methanol and dried in vacuo. Copolymer (6.1 g) was obtained. $^1$H NMR(ODCB-d$_4$) indicated a fluorinated monomer incorporation of 5.7 mole %: δ2.03(heptet, 2H, —$CH_2CH_2CF_2$—); 1.57(pentet, 2H, —$CH_2CH_2CF_2$—); 1.0–1.5(m, —$CH_2$—Õs and —CH—Õs of the polymer); 0.8–0.9(m, —$CH_3$Õs of the polymer). $^{19}$F NMR(ODCB-d$_4$): δ45.5(s, 1F, —$SO_2F$); –82.1, –87.1, –112.0, –117.2(s, 2F each, —$CF_2$Õs). The copolymer exhibited a Tm of 113° C. by DSC. GPC (TCB, 135° C., PE std): Mw=31,600; Mn=11,200; Mw/Mn=2.8.

EXAMPLE 2

Synthesis of an Ethylene copolymer of $CH_2=CH(CH_2)_4(CF_2)_2O(CF_2)_2SO_2F$

The catalyst rac-ethylenebis(indenyl)zirconium (IV) dichloride (3.2 mg, 0.0077 mmol) and $CH_2=CH(CH_2)_4(CF_2)_2O(CF_2)_2SO_2F$ (5.0 g, 0.013 mol) were mixed with 35 mL toluene in a Schlenk flask in a drybox. The flask was placed under 101 kPa (absolute) of ethylene and was purged with ethylene for 15 min at 0° C. PMAO (10 mL 7.1 wt % toluene solution) was added to the mixture. Reaction was immediately initiated. After stirring under 101 kPa of ethylene at 0° C. for 30 min, methanol(150 mL) was slowly added to the reaction mixture followed by 5 mL conc. HCl. The white solid polymer was filtered, washed with methanol and dried in vacuo. Copolymer(5.85 g) was obtained. $^1$H NMR(TCE-d$_2$) indicated a fluorinated monomer incorporation of 3.4 mole %: δ2.00(heptet, 2H, —$CH_2CH_2CF_2$—); 1.54(pentet, 2H, —$CH_2CH_2CF_2$—); 1.0–1.5 (m, —$CH_2$—Õs and —CH—Õs of the polymer); 0.88 (t, —$CH_3$Õs of the polymer). $^{19}$F NMR(ODCB-d$_4$): δ45.3(s, 1F, —$SO_2F$); –82.3, –87.2, –112.0, –117.3(s, 2F each, —$CF_2$Õs). The copolymer exhibited a Tm of 102° C. by DSC. GPC (TCB, 135° C., PE std): Mw=117,000; Mn=51,700; Mw/Mn=2.3.

EXAMPLE 3

Synthesis of an Ethylene Copolymer of $CH_2=CH(CH_2)_4(CF_2)_2O(CF_2)_2SO_2F$

The catalyst (t-butylamido) dimethyl ($\eta^5$-tetramethylcyclopentadienyl) silane titanium dichloride (see European Patent Application 416815) (2.9 mg, 0.0079 mmol) and $CH_2=CH(CH_2)_4(CF_2)_2O(CF_2)_2SO_2F$ (5.0 g, 0.013 mol) were mixed with 35 mL toluene in a Schlenk flask in a drybox. The flask was placed under 101 kPa (absolute) of ethylene and was purged with ethylene for 15 min at RT. PMAO (10 mL 7.1 wt % toluene solution) was added to the mixture. After stirring under 101 kPa of ethylene at RT for 69 h, methanol(200 mL) was slowly added to the reaction mixture followed by 5 mL conc. HCl. The white solid polymer was filtered, washed with methanol and dried in vacuo. Copolymer (0.12 g) was obtained. $^1$H NMR(ODCB-d$_4$) indicated a fluorinated monomer incorporation of 1.5 mole %: δ2.01(heptet, 2H, —$CH_2CH_2CF_2$—); 1.55(pentet, 2H, —$CH_2CH_2CF_2$—); 1.0–1.5(m, —$CH_2$—Õs and —CH—Õs of the polymer); 0.88(t, —$CH_3$Õs of the polymer). $^{19}$F NMR(ODCB-d$_2$): δ45.1(s, 1F, —$SO_2F$); –82.3, –87.4, –112.2, –117.5(s, 2F each, —$CF_2$Õs). The copolymer exhibited a Tm of 131° C. by DSC. GPC (TCB, 135° C., PE std): Mw=41,600; Mn=3,560; Mw/Mn=13.

EXAMPLE 4

Synthesis of the ethylene copolymer of $CH_2=CH(CH_2)_4(CF_2)_2O(CF_2)_2SO_2F$

The catalyst dimethylsilybis(cyclopentadienyl)zirconium dichloride [see H. Yasuda, et al., organometallics, vol. 3, p. 1470–1478 (1984) and C. S. Bajgur, et al., Inorg. Chem., vol. 24, p. 2359–2546 (1985); a small modification was made to the procedure to increase yield] (2.7 mg, 0.0077 mmol) and $CH_2=CH(CH_2)_4(CF_2)_2O(CF_2)_2SO_2F$ (5.0 g, 0.013 mol) were mixed with 35 mL toluene in a Schlenk flask in a drybox. The flask was placed under 101 kPa (absolute) of ethylene and was purged with ethylene for 15 min at 0° C. PMAO (10 mL 7.1 wt % toluene solution) was added to the mixture. After stirring under 101 kPa of ethylene at 0° C. for 30 min, methanol (150 mL) was slowly added to the reaction mixture followed by 5 mL conc. HCl. The white solid polymer was filtered, washed with methanol and dried in vacuo. Copolymer (2.54 g) was obtained. $^1$H NMR indicated a fluorinated monomer incorporation of 2.7 mole %. The copolymer exhibited a Tm of 112° C. by DSC. GPC (TCB, 135° C., PE std): Mw=38,500; Mn=13,900; Mw/Mn=2.8.

EXAMPLE 5

Synthesis of a Propylene Copolymer of $CH_2=CH(CH_2)_4(CF_2)_2O(CF_2)_2SO_2F$

The catalyst rac-ethylenebis(indenyl)zirconium (IV) dichloride (3.2 mg, 0.0077 mmol) and $CH_2=CH(CH_2)_4$ $(CF_2)_2O(CF_2)_2SO_2F$ (5.0 g, 0.013 mol) were mixed with 35 mL toluene in a Schlenk flask in a drybox. The flask was placed under 122 kPa (absolute) of propylene and was purged with propylene for 15 min at RT. PMAO (10 mL 7.1 wt % toluene solution) was added to the mixture. Reaction was initiated and was moderately exothermic. After stirring under 122 kPa of propylene at RT for 68 min, methanol(150 mL) was slowly added to the reaction mixture followed by 5 mL conc. HCl. The white solid polymer was filtered, washed with methanol and dried in vacuo. Copolymer (10.36 g) was obtained. The polymer was isotactic. $^1$H NMR(TCE-d$_2$) indicated a fluorinated monomer incorporation of 5.6 mole %: δ2.00(heptet, —CH$_2$CH$_2$CF$_2$—); 1.55 (m, 1H, —CH$_2$—CH(CH$_3$)—, also overlapped —CH$_2$CH$_2$CF$_2$—); 1.23(m, 1H, —CHHOCH(CH$_3$)—); 0.8–0.9(d, 3H, —CH$_2$CH(CH$_3$), also overlapped —CHH OCH(CH$_3$)—, m, 1H). $^{19}$F NMR(ODCB-d$_4$): δ45.1(s, 1F, —SO$_2$F); –82.2, –87.2, –112.1, –117.2(s, 2F each, -CF$_2$ Os). The copolymer exhibited a Tm of 105° C. by DSC. GPC (TCB, 135° C., PE std): Mw=8,310; Mn=3,410; Mw/Mn=2.4.

EXAMPLE 6

Synthesis of a Propylene Copolymer of $CH_2$=CH $(CH_2)_4(CF_2)_2O(CF_2)_2SO_2F$ The catalyst bis-2-(4-methylphenyl)indenyl zirconium dichloride (see U.S. Pat. No. 5,594,080, whose procedure was slightly modified) (4.4 mg, 0.0077 mmol) and $CH_2$=CH(CH$_2$)$_4$(CF$_2$)$_2$O(CF$_2$)$_2$SO$_2$F (5.0 g, 0.013 mol) were mixed with 20 mL toluene in a Schlenk flask in a drybox. The flask was placed under 138 kPa (absolute) of propylene and was purged with propylene for 15 min at RT. PMAO (10 mL 7.1 wt % toluene solution) was added to the mixture. After stirring under 138 kPa of propylene at RT for 27 h, methanol (150 mL) was slowly added to the reaction mixture followed by 5 mL conc. HCl. A sticky oil was isolated, redissolved in hexanes and was reprecipitated with methanol. The viscous oil was isolated, washed with methanol and dried in vacuo. Copolymer (2.4 g) was obtained. $^1$H NMR(CD$_2$Cl$_2$) indicated a fluorinated monomer incorporation of 2.9 mole %: δ1.95(heptet, —CH$_2$CH$_2$CF$_2$—); 1.52 (m, 1H, —CH$_2$—CH(CH$_3$)—, also overlapped —CH$_2$CH$_2$CF$_2$—); 1.12(m, 1H, —CHHOCH(CH$_3$)—); 0.90(m, 1H, , —CHHOCH(CH$_3$)—); 0.83(d, 3H, —CH$_2$CH (CH$_3$),). The copolymer is atactic and it exhibited a Tg of –20° C. by DSC. GPC (THF, PS std): Mw=20,214; Mn=6, 374; Mw/Mn=3.2.

EXAMPLE 7

Synthesis of an Ethylene Copolymer of $CH_2$=CH $(CH_2)_4(CF_2)_5CF_3$

The catalyst rac-ethylenebis(indenyl)zirconium (IV) dichloride (2.0 mg, 0.0048 mmol) and $CH_2$=CH(CH$_2$)$_4$ $(CF_2)_5CF_3$ (1.64 g, 0.0038 mol) were mixed with 20 mL toluene in a Schlenk flask in a drybox. The flask was placed under 101 kPa (absolute) of ethylene and was purged with ethylene for 15 min at 0° C. PMAO (6.2 mL 7.1 wt % toluene solution) was added to the mixture. After stirring under 101 kPa of ethylene at 0° C. for 20 min, methanol (120 mL) was slowly added to the reaction mixture followed by 5 mL conc. HCl. The white solid polymer was filtered, washed with methanol and dried in vacuo. Copolymer (0.76 g) was obtained. $^1$H NMR(ODCB-d$_4$) indicated a fluorinated monomer incorporation of 1.0 mole %: δ2.05(heptet, 2H, —CH$_2$CH$_2$CF$_2$—); 1.58 (pentet, 2H, —CH$_2$CH$_2$CF$_2$—); 1.0–1.5(m, —CH$_2$—Os and —CH—Os of the polymer); 0.8–0.9(t, —CH$_3$Os of the polymer). $^{19}$F NMR(ODCB-d$_4$): δ –81.6(s, 3F, —CF$_2$CF$_3$); –113.9, –122.2, –123.0, –123.6, –126.3(s, 2F each, —CF$_2$Os). The copolymer exhibited a Tm of 124° C. by DSC. GPC (TCB, 135° C., PE std): Mw=173,000; Mn=70,200; Mw/Mn=2.5.

What is claimed is:

1. A process for preparing a polymer comprising the step of copolymerizing a first olefin with at least one second olefin, said second olefin containing only carbon and hydrogen, using as a polymerization catalyst system either a Ziegler-Natta catalyst or a metallocene catalyst, wherein said first olefin has the formula $H_2C$=CH(CH$_2$)$_a$R$_f$R$^1$, and wherein:

a is an integer of 2 to 20;

R$_f$ is perfluoroalkylene optionally containing one or more ether groups; and

R$^1$ is a functional group other than fluorine.

2. The process as recited in claim 1 wherein R$_f$ is selected from the group consisting of —(CF$_2$)$_g$—, wherein g is 2 to 20, —(CF$_2$)$_h$OCF$_2$CF$_2$— wherein h is 2 to 20.

3. The process as recited in claim 1 wherein R$^1$ is chlorine, bromine, iodine, —P(O)(OR$^3$)$_2$ wherein each R$^3$ is independently hydrocarbyl, sulfonic acid, or sulfonyl halide.

4. The process as recited in claim 1 wherein R$^1$ is sulfonyl fluoride.

5. The process as recited in claim 2 wherein R$^1$ is sulfonyl fluoride.

6. The process as recited in claim 1 wherein a polymer produced has about 0.1 to about 50 mole percent of repeat units derived from said first olefin.

7. The process as recited in claim 1 wherein said second olefin is ethylene, propylene, or a combination of ethylene and propylene.

8. The process as recited in claim 4 wherein said second olefin is ethylene, propylene, or a combination of ethylene and propylene.

9. The process as recited in claim 1 wherein said polymerization catalyst system is a metallocene catalyst.

10. The process as recited in claim 1 wherein said second olefin is one or more of ethylene, propylene or an α-olefin.

* * * * *